United States Patent [19]
Brezny

[11] 4,407,972
[45] Oct. 4, 1983

[54] EROSION-RESISTANT REFRACTORY

[75] Inventor: Bohus Brezny, Middletown, Ohio

[73] Assignee: Armco Inc., Middletown, Ohio

[21] Appl. No.: 461,175

[22] Filed: Jan. 26, 1983

Related U.S. Application Data

[63] Continuation of Ser. No. 258,025, Apr. 27, 1981, abandoned.

[51] Int. Cl.³ ............................................. C04B 35/52
[52] U.S. Cl. ..................................... 501/99; 501/100;
501/101; 501/109; 501/110
[58] Field of Search ................................. 501/99–101,
501/109, 110

[56] References Cited

U.S. PATENT DOCUMENTS 2,013,625  9/1935  Buck ...................................... 501/90
2,741,822  4/1956  Udy ...................................... 501/108
3,226,456 12/1965  Ryshkewitch et al. ............. 501/153
3,322,551  5/1967  Bowman .............................. 501/109
4,306,030 12/1981  Watanabe et al. ..................... 501/99

Primary Examiner—James Poer
Attorney, Agent, or Firm—Frost & Jacobs

[57] ABSTRACT

A refractory shape having improved resistance to erosion in metal melting vessels and high modulus of rupture, comprising an anhydrous refractory material, an anhydrous organic binder, from 0.3% to about 30% finely divided elemental carbon having a particle size ranging from 0.01 to about 1 mm, and from 0.3% to about 10% particulate elemental magnesium, based on the weight of the refractory shape. Addition of both elemental carbon and elemental magnesium results in a synergistic improvement in slag erosion resistance.

20 Claims, 3 Drawing Figures

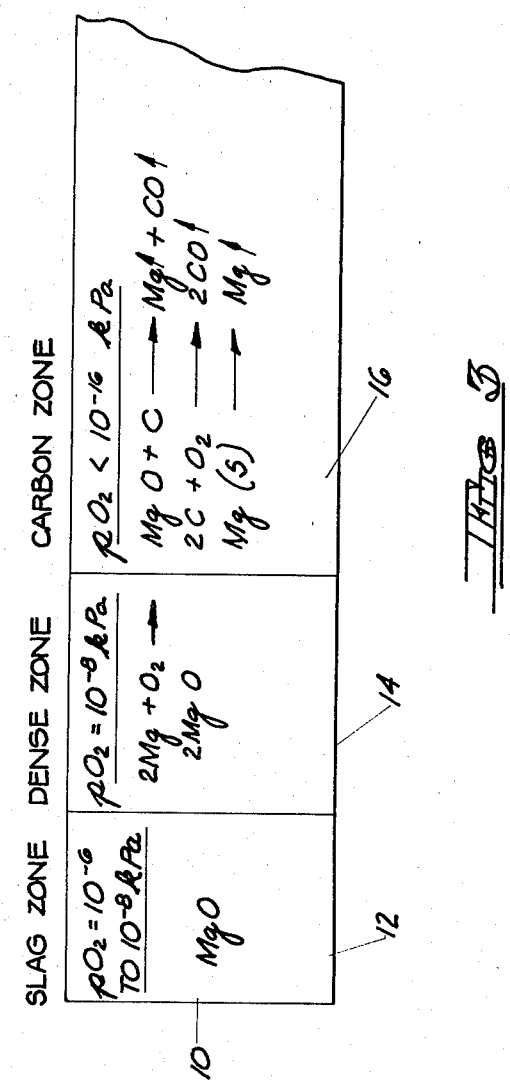

EROSION-RESISTANT REFRACTORY

CROSS REFERENCE TO RELATED APPLICATION

This is a continuation of application Ser. No. 258,025 filed Apr. 27, 1981 in the name of Bohus Brezny, now abandoned.

BACKGROUND OF THE INVENTION

This invention relates to a chemically bonded refractory shape, having particular utility in any steel-making plant (except an open hearth furnace) which has an external metal jacket which prevents air from being absorbed into the cold face of the refractory, such as a basic oxygen furnace (BOF), electric furnace, argon-oxygen degassing unit (AOD), and vacuum induction melting furnace (VIM). The refractory shape of the present invention exhibits a synergistic improvement in resistance against slag erosion, together with increased modulus of rupture, crushing strength and oxidation resistance, by reason of additions of both particulate metallic magnesium and particulate elemental carbon to the refractory mix.

Pitch-bonded, hot formed refractory shapes (e.g. in the form of bricks) wherein the refractory material is magnesia, doloma, or alumina, and the pitch is derived from coal tar or petroleum, have found increasing use in lining vessels used for refining steel. Various proposals and additives have been suggested by the prior art for improving resistance against erosion by slag, molten metal, and hot gases.

The present invention constitutes a further improvement in the desired properties, particularly erosion resistance, of refractory shapes of the above type for use in steel refining vessels.

U.S. Pat. No. 2,013,625 discloses a refractory article having a vitreous protective surface in which the refractory aggregates are bonded by residual carbon (which may be derived from tar, pitch, resin, molasses, or dextrin), and in which a metallic substance (such as iron, manganese, magnesium, copper, lead, zinc, or alloys) is dispersed throughout the article.

U.S. Pat. No. 2,741,822 discloses a shaped refractory article comprising a fused mass of a single refractory oxide (alumina, magnesia, or silica) and granulated metal (aluminum, magnesium, or silicon) in a ratio of about 10 parts oxide to 1 part metal, the shaped article then being oxidized at about 1000°-1200° C. to oxidize and fuse the metal particles substantially completely. A volatile organic bonding agent is also mixed initially with the metallic oxide.

U.S. Pat. No. 3,226,456 discloses the production of increased density ceramic articles by mixing with a metal oxide about 0.02% to 0.1% by weight of the same metal in particulate form ranging in size between about 1 and 40 microns, followed by shaping at a temperature up to about 1825° C. and molding under pressure. Metals which may be used are aluminum, beryllium, magnesium, thorium and zirconium. The metal is at least partially oxidized in situ during the shaping and heating step.

U.S. Pat. No. 3,322,551 discloses a pitch-bonded, basic refractory to which is added from 0.5% to 1.5% by weight of the refractory batch of finely divided aluminum or magnesium. When pitch having a softening point above 200° F. was used (in an amount of 1% to 10% of the total batch weight) as the bonding agent, an improvement in erosion resistance was obtained under conditions simulating an oxygen steel converter. The metal particle size was less than 0.210 mm (all passing a 65 mesh screen), and preferably less than 0.149 mm (all passing a 100 mesh screen).

German OLS No. 3004712, published Aug. 21, 1980, in the names of Kyusyu Refractories, discloses the production of unfired refractory carbon bricks by adding from 1% to 10% aluminum and/or magnesium powder to a refractory material containing greater than 1%, and especially from 5% to 75% carbon. The particle size of the metal powder is preferably less than 0.125 mm. From 0.5% to 6% silicon powder may also be added to prevent the hydration of carbides. Increased resistance to oxidation and reduced porosity are alleged to result from the aluminum and/or magnesium addition.

The formation of a dense zone of magnesium oxide just behind the hot face of pitch bonded magnesia or doloma brick during service in BOF or AOD vessels is disclosed in articles co-authored by the present applicant, viz. "Microstructural and Chemical Changes of Pitch Impregnated Magnesite Brick under Reducing Conditions", Trans. British Ceramic Society, Vol. 71, No. 6, pp. 163-170, Sept. 1972, B. Brezny and R. A. Landy; and "Role of Carbon in Steel Plant Refractories.", The American Ceramic Society Bulletin, Vol. 55, No. 7, pp. 649-654, July 1976, B. H. Baker, B. Brezny and R. L. Shultz. A discussion of this phenomenon also occurs in U.S. Pat. No. 4,196,894 issued Apr. 8, 1980 to the present applicant. Briefly summarized, it appears that in the carbon zone of the brick magnesium oxide is reduced to metallic magnesium by the carbon in the pitch bond, during service. The metallic magnesium is vaporized and migrates toward the hot face of the brick. In the region just behind the hot face the magnesium is oxidized back to magnesium oxide and is precipitated there to form a dense zone. Any voids originally present are filled by the magnesium oxide precipitate, preventing penetration by slag, hot metal and/or gases, and therefore decreasing erosion.

Although not intending to be bound by theory, it is believed that the same phenomenon as that described above occurs in the refractory shape of the present invention during service. However, this invention constitutes the further discovery that a marked improvement in erosion resistance occurs when both particulate elemental carbon and particulate elemental magnesium are added to a refractory mixture having an organic binder, this improvement being of far greater magnitude than that obtained by adding particulate elemental magnesium alone to a pitch bonded refractory, and that obtained by adding particulate elemental carbon alone to a pitch bonded refractory. The addition of carbon and magnesium in combination thus produces a true synergistic effect, which is substantiated by test data hereinafter set forth.

It has been found that the markedly improved erosion resistance, which is the principal object of the present invention, is achieved by use of an anhydrous refractory material, an anhydrous organic binder, at least 0.3% finely divided elemental carbon having a particle size between 0.01 and about 1 mm and at least 0.3% particulate elemental magnesium, based on the total weight of the refractory mix. Residual carbon derived from the binder as a result of coking (which occurs during service) has been found to be ineffective in producing marked improvement in erosion resistance regardless of the amount of magnesium added.

Where a brick of conventional type having about 5% anhydrous organic binder (such as pitch) is being produced in accordance with the invention, the elemental carbon addition ranges from 0.3% to 3% by weight and the elemental magnesium addition from 0.3% to 3.5% by weight. There is also presently available brick having carbon additions up to 25% to even 30% for high thermal conductivity. The brick of the present invention can be produced at carbon levels up to 30% by weight if flake graphite having a particle size of about 1 mm is added, and in this embodiment up to about 10% elemental magnesium is added.

According to the invention there is thus provided a refractory shape having improved resistance to erosion, comprising an anhydrous refractory material, an anhydrous organic binder in an amount sufficient to bond said refractory material, from 0.3% to about 30% finely divided elemental carbon having a particle size ranging from 0.01 to about 1 mm, and from 0.3% to about 10% particulate elemental magnesium, based on the total weight of the refractory shape.

BRIEF DESCRIPTION OF THE DRAWING

Reference is made to the accompanying drawing wherein:

FIG. 3 is a fragmentary diagrammatic vertical section of a refractory brick of the invention showing the conditions occurring during service at the hot face contaminated with slag.

DETAILED DISCLOSURE

Figure 1:
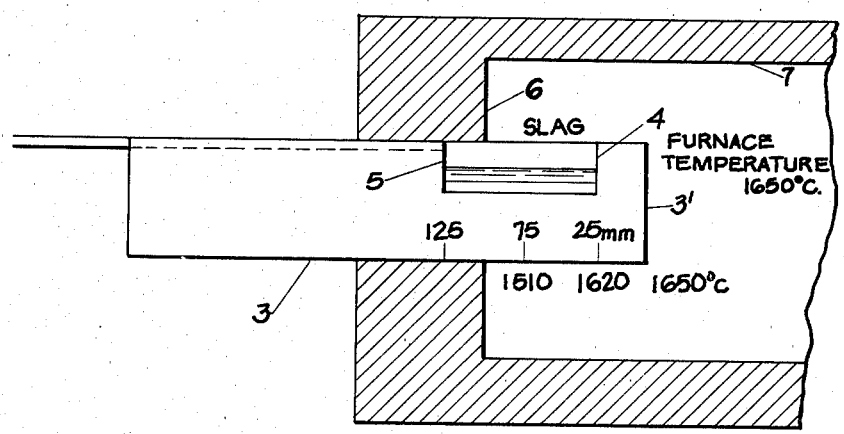
FIG. 1 is a diagrammatic vertical sectional view of a slag erosion test apparatus used to evaluate refractory shapes.

The refractory material may be of conventional type ordinarily used for production of refractory brick derived from magnesia, doloma, or alumina. For a magnesia refractory exemplary particle size distribution may be as follows:

coarse grains: 42%
fine coarse: 18%
intermediate (−28 M): 15%
ball mill fines: 25%

The refractory material must be anhydrous since metallic magnesium reacts with water even at room temperature to form magnesium oxide.

The organic binder may be coal tar or petroleum pitch or an anhydrous resin, preferably a thermosetting resin. Resin compositions containing water or producing water during polymerization cannot be used for the reason set forth above. Anhydrous epoxy resins are presently available.

In the conventional forming of chemically bonded brick the brick is ordinarily dried after being pressed into shape at a temperature of about 260° C. The purpose of the drying step, when anhydrous refractory material and anhydrous organic binder are used, is to drive off volatile components from the binder, thereby minimizing smoke problems when in service, and to increase the green strength of the brick. In the practice of the present invention, when coal tar or petroleum pitch is used as the organic binder, the softening point of the pitch does not constitute a limitation.

The finely divided elemental carbon may be thermal black, graphite, synthetic graphite, ground coke, ground used electrodes, coal dust, or coke breeze, and good results have been obtained with carbon having a particle size of about 0.075 mm. A preferred particle size range is thus from about 0.05 to about 0.08 mm, although carbon having a particle size distribution throughout the commercially available ranges of 0.01 to 1 mm can be used. The very fine sizes less than about 0.05 mm are more difficult to use because of dusting, compressibility and wettability problems.

The particle size of the metallic magnesium is not critical and can range up to about 0.50 mm. Good results have been obtained with powdered magnesium passing a 40 mesh screen (U.S. Standard) having openings of 0.42 mm.

At least 0.3% finely divided elemental carbon is necessary in order to obtain the marked improvement in erosion resistance of the present invention. An upper limit of about 3% carbon for the lower carbon embodiment described above is preferred, since amounts in excess of about 3% adversely affect the compressibility of the refractory shape unless the carbon is added in the form of graphite having a particle size of about 1 mm. More preferably from about 0.5% to about 2.7% carbon is used, in the form of graphite or carbon black having a particle size ranging from about 0.05 to about 0.08 mm.

A minimum of 0.3% particulate metallic magnesium must be present in order to achieve the marked improvement in erosion resistance of the present invention. A maximum of about 3.5% magnesium is preferred in the low carbon embodiment described above, while up to about 10% magnesium is preferred when carbon is added in amounts up to 30% by weight. More preferably from about 0.5% to about 3.0% magnesium is present. Best results are obtained when the sum total of elemental carbon plus magnesium is at least about 2.0% by weight, based on the total weight of the refractory shape.

The present invention does not extend to the production of high fired brick. Such brick is fired at temperatures up to or exceeding about 1500° C. Since elemental magnesium boils at 1107° C., the firing would vaporize the magnesium and cause it to diffuse from the brick, even if reducing conditions were maintained within the brick.

As indicated above, the present invention constitutes a discovery that residual carbon derived from the organic binder as a result of coking does not produce a synergistic effect with metallic magnesium in improving erosion resistance. The reason for this is not known at the present time, although it is noted that residual carbon derived from pitch is extremely fine in particle size. The particle size of the elemental carbon (in the form of graphite or thermal black) added in accordance with the present invention is on the order of about 100 times larger than the particle size of residual carbon from pitch. It is possible that the difference in particle size or perhaps distribution of residual carbon accounts for its inability to function in the same manner as the elemental carbon having a particle size ranging from 0.01 to about 1 mm, which is added in accordance with the present invention.

Reference is made to FIG. 3, which is a diagrammatic illustration of the manner in which a dense magnesia zone is formed during service behind the hot face of a brick. In FIG. 3 the hot face is indicated at 10, the hot face slag zone at 12, the dense zone at 14, and the carbon zone of the brick at 16. It should be recognized that the dimensions of the zones are not accurately portrayed in FIG. 3, and that the dense zone 14 starts at a distance slightly less than 1.25 mm from the hot face 10 and extends inwardly therefrom a relatively short distance of several millimeters. The carbon zone 16 extends throughout the remainder of the brick. In the carbon zone 16 of FIG. 3 the partial pressure of oxygen is no greater than about $10^{-16}$ atmospheres. Accordingly, magnesia, residual carbon, elemental magnesium and added elemental carbon are all present. As the temperature in the carbon zone increases during service the reactions which occur are shown in FIG. 3. Although very little oxygen is present, that which does exist combines with carbon to form gaseous CO. Magnesium in solid form is vaporized, and at least part of this magnesium vapor diffuses into the dense zone 14 where the oxygen partial pressure is on the order of $10^{-8}$ atmospheres. Zone 14 is substantially carbon free and hence no carbon is available to react with oxygen present in zone 14. The vaporized magnesium diffusing into this zone thus reacts with oxygen to produce magnesium oxide which is deposited in the voids among the particles of the magnesia refractory material already present. This deposition of magnesium oxide results in formation of the dense zone which is relatively impervious to penetration by slag, molten metal and/or hot gases which do penetrate the hot face slag zone 12. In zone 12 the oxygen partial pressure is still higher, being on the order of $10^{-6}$ to $10^{-8}$ atmospheres, due to the presence of various oxides in the slag which come into contact with the hot face 10. It will of course be understood that as the hot face 10 is gradually eroded in service, the zones 12 and 14 gradually move toward the carbon zone, i.e. toward the right in FIG. 3.

The formation of metallic magnesium as a result of reduction of magnesia by carbon occurs in conventional refractory bricks in the carbon zone, but the addition of metallic magnesium and elemental carbon in accordance with this invention increases the amount of vaporized magnesium which migrates or diffuses into the dense zone 14 and thus increases the amount of magnesium oxide deposited in the dense zone. It will be understood that the hot face 10 is subjected to temperatures of at least about 1600° C. during service and that the temperature gradient gradually decreases from this value through the hot face slag zone and the dense zone to a much lower temperature within the interior of the brick in the carbon zone.

An initial series of compositions was prepared having varying combinations of powdered metallic magnesium and elemental carbon along with comparative compositions in which one or the other of magnesium or carbon was omitted. These were subjected to tests and the properties were determined. The compositions and test results are set forth in Table I.

All samples were prepared from the same batch of magnesite refractory material having 42% coarse grains, 18% fine coarse, 15% intermediates (−28M) and 25% ball mill fines.

For comparative purposes samples A and B contained no elemental carbon additions but contained additions of particulate elemental magnesium. Samples E and H were regarded as standards for comparison since they contained additions of elemental carbon (thermal black) and no magnesium, which is now conventional. Samples L, M and O also contained no magnesium, and the elemental carbon additions therein were somewhat higher than the current standard.

The synthetic resin used as an organic binder in samples H through O was a phenol-formaldehyde type containing about 25% water when added as a binder.

It is evident that the addition of metallic magnesium increased the modulus of rupture of the bricks very significantly, particularly after coking, for samples A through D, F and G, as compared to sample E containing no magnesium. In the case of samples H through O, the presence of water in the resin binder is believed to have resulted in oxidation of the magnesium powder added in samples I, J, K and N. As a result, modulus of rupture values showed no consistent increase.

Density of the pressed bricks and porosity after coking were not substantially affected.

Turning next to the property of principal interest, namely erosion by slag, it is evident that samples C, D and G exhibited very substantial increases in erosion resistance as compared to sample A containing no added elemental carbon and 2.5% magnesium, and sample E containing 2.6% thermal black carbon and no magnesium. Samples H through O, in which the organic binder was a resin containing water, exhibited erratic erosion resistance values, regardless of additives. The best value was sample M containing 2.4% thermal black carbon, 1.0% flake graphite and no magnesium powder. Examples H through O are believed to demonstrate the criticality of using an anhydrous organic binder.

The sample bricks of Table I were dried at 260° C. before tests and were coked at about 980° C. in a nitrogen atmosphere.

The values reported in Table I for percent erosion were determined by the standard Rotary Slag Test, wherein a refractory specimen in the form of a tube is mounted with one end dipped into molten slag while gases are injected into the opposite end. The tube is rotated for a specified time, and erosion is then measured as a percentage.

A second series of test bricks was prepared from a magnesite of the same type as that used in the first series with varying combinations of powdered metallic magnesium and elemental carbon, together with comparative samples in which either magnesium or carbon was omitted. These samples were dried at about 260° C. and coked at about 980° C. in a nitrogen atmosphere. The samples were then tested for resistance against erosion in a test apparatus illustrated in FIGS. 1 and 2, and the test results were reported as depth of erosion in millimeters, rather than as a percentage. The amount of additive and depth of erosion for each of the second series of samples is reported in Table II. All samples contained 4.0% pitch binder.

Figure 2:
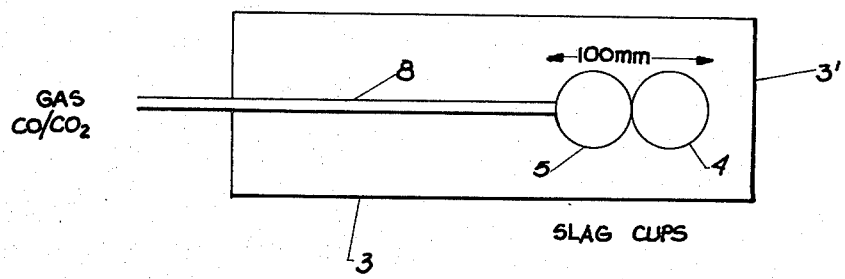
FIG. 2 is a fragmentary top view of the apparatus of FIG. 1.

Erosion values as reported in Table II were determined by the Thermal Gradient Slag Test, illustrated in FIGS. 1 and 2. A brick size sample indicated at 3, of 225 mm length, has 2 cups 4 and 5 drilled therein each of 50 mm diameter with the edge of cup 4 positioned 25 mm behind the hot face 3' of the brick. Each cup is filled with a 200 gm sample of test slag, and the sample is then placed in the door 6 of a gas fired laboratory furnace 7 in the manner shown in FIG. 1. The thermal gradient is measured by a set of Pt-Rh thermocouples (not shown) placed at 25 mm intervals behind the hot face of the test sample. (The thermal gradient can be varied by changing the position of a test sample relative to the front wall of the furnace.)

Samples were tested at a furnace temperature of 1650° C. for three hours. The depth of erosion in mm in the cups 4 and 5 was then determined.

For slag testing under reducing conditions a ceramic tube 8 is provided, which is positioned in a pre-cut groove in the test brick 3, and a mixture of CO and $CO_2$, or natural gas, is injected into the cups during the slag test.

In Table II, sample 1 containing no elemental carbon or elemental magnesium addition, exhibited very poor erosion resistance. Samples 2 and 3 containing elemental carbon additions of 0.6% and 2.6% respectively, but with no elemental magnesium addition, exhibited slight improvement over sample 1. Samples 4 and 5, containing elemental magnesium additions of 1.5% and 2.5% respectively, but with no elemental carbon addition, also exhibited slight improvement over sample 1. Samples 6 through 15, which were representative of the present invention, showed increases in erosion resistance in comparison to samples 1 through 5, with the preferred and more preferred compositions of samples 7 through 11, 14 and 15 showing very marked improvement, thus demonstrating the synergistic effect resulting from addition of both elemental carbon and elemental magnesium within the percentage ranges defined above.

The data of Table II indicate that no particular ratio of carbon to magnesium needs to be observed, as will be apparent from a comparison of samples 6, 7, 12 and 13. Substantially equivalent results were obtained with carbon at 0.3% and 0.6%, respectively (plus 1.5% magnesium), and magnesium at 0.3% and 0.6% respectively (plus 2.0% carbon) provided that a sufficient addition of the other element was present. It is therefore believed that a sum total of carbon plus magnesium of at least about 2.0%, with a minimum of at least 0.3% of either elemental carbon or magnesium, provides optimum results.

For a low carbon brick of the type described above, about 3% to 5% pitch ordinarily is added as a binder. For the high carbon brick (containing up to about 30% carbon) up to about 8% pitch may be needed as a binder.

From the above description it is apparent that the present invention also provides a method of increasing resistance to erosion of refractory linings, which comprises mixing an anhydrous refractory material, an anhydrous organic binder therefor, at least 0.3% finely divided elemental carbon having a particle size ranging from 0.01 to about 1 mm, and at least 0.3% particulate elemental magnesium, based on the total weight of the refractory mix, forming the mixture into bricks, drying the bricks, and positioning the bricks in a melting vessel at least in the regions thereof subject to severe erosion.

In the preferred and more preferred practice of the method, the preferred and more preferred percentage ranges of elemental carbon and elemental magnesium are mixed with the refractory material and the binder.

While the invention has been described in terms of exemplary compositions, modifications may be made without departing from the spirit and scope of the invention, and it will be understood that the invention is not to be limited except insofar as set forth in the accompanying claims.

TABLE I

| Sample | \multicolumn{15}{c}{BONDED MIX COMPOSITIONS AND PROPERTIES} |
|---|---|---|---|---|---|---|---|---|---|---|---|---|---|---|---|
|  | A | B | C | D | E | F | G | H | I | J | K | L | M | N | O |
| Binder - wt. %* | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Carbon - wt. % |  |  |  |  |  |  |  |  |  |  |  |  |  |  |  |
| Thermal black | 0 | 0 | 0.6 | 2.0 | 2.6 | 2.6 | 2.6 | 2.6 | 2.6 | 0 | 0 | 3.4 | 2.4 | 2.4 | 2.4 |
| Flake graphite | 0 | 0 | 0 | 0 | 0 | 0 | 0 | 0 | 0 | 2.6 | 5.2 | 0 | 1.0 | 1.0 | 1.0 |
| Mg powder - wt. % | 2.5 | 1.5 | 2.5 | 1.5 | 0 | 2.0 | 3.0 | 0 | 3.0 | 3.0 | 3.0 | 0 | 0 | 3.0 | 0 |
| Density, Pressed mg/m³ | 3.02 | 3.08 | 3.03 | 3.09 | 3.11 | 3.08 | 3.06 | 3.14 | 3.07 | 3.04 | 3.03 | 3.07 | 3.11 | 3.04 | 3.11 |
| Modulus of Rupture at 510 C MPa | 5.0 | 1.2 | 2.7 | 0.8 | 0.8 | 0.9 | 1.5 | 6.1 | 3.6 | 4.2 | 3.6 | 5.7 | 7.0 | 3.6 | 4.7 |
| Slag Test, % Erosion | 16.3 | ND | 7.2 | 9.1 | 13.3 | ND | 4.5 | 13.6 | 15.6 | 16.4 | ND | ND | 7.2 | 10.0 | ND |
| Modulus of Rupture Cold after Coking MPa | 102 | 23.8 | 93.5 | 30.1 | 4.40 | 19.2 | 40.5 | 7.1 | 2.8 | 7.6 | 6.5 | 8.6 | 6.2 | 1.8 | 3.5 |
| Porosity, % after Coking | 4.6 | 5.1 | 8.75 | 3.3 | 8.3 | 7.3 | 6.0 | 9.6 | 6.3 | 11.2 | 8.9 | 7.8 | 10.3 | ND | 10.7 |

*Binder in A through G was pitch; H through O synthetic resin
ND = Not Determined

TABLE II

| | SLAG EROSION TEST | | |
|---|---|---|---|
| Sample | C Wt. % | Mg Wt. % | Depth of Erosion (mm) |
| 1 | 0 | 0 | 11 |
| 2 | 0.6 | 0 | 9 |
| 3 | 2.0 | 0 | 8 |
| 4 | 0 | 1.5 | 9 |
| 5 | 0 | 2.5 | 9 |
| 6* | 0.3 | 1.5 | 7 |
| 7* | 0.6 | 1.5 | 4 |
| 8* | 2.6 | 2.5 | 2 |
| 9* | 2.6 | 3.0 | 2 |
| 10* | 2.6 | 1.5 | 2 |
| 11* | 2.0 | 2.5 | 2 |
| 12* | 2.0 | 0.3 | 5 |
| 13* | 2.0 | 0.6 | 6 |
| 14* | 0.6 | 2.5 | 4 |
| 15* | 2.0 | 1.0 | 4 |

*Present invention

I claim:

1. A chemically bonded refractory shape having improved resistance to erosion for use in a steel making plant wherein the hot face of the shape is subjected to temperatures of at least about 1600° C. and the cold face is shielded from oxygen penetration, consisting essentially of an anhydrous refractory material, an anhydrous organic binder in an amount sufficient to bond said refractory material, from 0.3% to about 3% finely divided elemental carbon having a particle size ranging from 0.01 to about 1 mm, and from 0.3% to about 3.5% particulate elemental magnesium, based on the total weight of the refractory shape.

2. The refractory shape claimed in claim 1, containing from about 0.5% to about 2.7% elemental carbon in the form of graphite or carbon black having a particle size ranging from about 0.05 to about 0.08 mm, and from about 0.5% to about 3.0% elemental magnesium.

3. The refractory shape claimed in claim 1, wherein the sum total of elemental carbon plus elemental magnesium is at least about 2.0%.

4. The refractory shape claimed in claim 1, wherein said refractory material is derived from at least one of magnesia, doloma, and alumina, and said binder is coal tar or petroleum pitch.

5. The refractory shape claimed in claim 4, containing about 3% to about 5% of said pitch, based on the total weight of the refractory shape.

6. The refractory shape claimed in claim 1, wherein said elemental magnesium has a particle size up to about 0.50 mm.

7. The refractory shape claimed in claim 1, wherein said organic binder comprises about 3% to about 5% anhydrous resin, based on the total weight of the refractory shape.

8. The refractory shape claimed in claim 1, wherein said shape is a brick used in a steel making plant.

9. A chemically bonded refractory brick which, during service in a metal melting vessel, develops a dense zone of magnesium oxide within said brick adjacent the hot face thereof, said hot face being subjected to temperatures of at lest about 1600° C., said brick consisting essentially of an anhydrous refractory material, an anhydrous organic binder in an amount sufficient to bond said refractory material, from 0.3% to about 3% finely divided elemental carbon having a particle size ranging from 0.01 to about 1 mm, and from 0.3% to about 3.5% particulate elemental magnesium, based on the total weight of the refractory brick.

10. The brick claimed in claim 9, containing from about 0.5% to about 2.7% elemental carbon in the form of graphite or carbon black having a particle size ranging from about 0.05 to about 0.08 mm, and from about 0.5% to about 3.0% elemental magnesium.

11. The brick claimed in claim 9, wherein said refractory material is derived from at least one of magnesia, doloma, and alumina, and said binder is coal tar or petroleum pitch.

12. The brick claimed in claim 11, containing about 3% to about 5% of said pitch, based on the total weight of the refractory brick.

13. The brick claimed in claim 9, wherein said elemental magnesium has a particle size ranging up to about 0.05 mm.

14. The brick claimed in claim 9, wherein said metal melting vessel is a steel making plant.

15. A method of increasing resistance to erosion of refractory linings which comprises mixing an anhydrous refractory material, an anhydrous organic binder therefor, at least 0.3% finely divided elemental carbon having a particle size ranging from 0.01 to about 1 mm, and at least 0.3% particulate elemental magnesium, based on the total weight of the refractory mix, forming the mixture into bricks, and positioning said bricks in a melting vessel at least in regions thereof subject to severe erosion.

16. The method claimed in claim 15, wherein from 0.3% to about 3% elemental carbon and from 0.3% to about 3.5% elemental magnesium are mixed with said refractory material and said binder.

17. The method claimed in claim 15, wherein from about 0.5% to about 2.7% elemental carbon having a particle size ranging from about 0.05 to about 0.08 mm, and from about 0.5% to about 3.0% elemental magnesium are mixed with said refractory material and said binder.

18. The method claimed in claim 15, wherein said organic binder comprises about 3% to about 5% coal tar or petroleum pitch, based on the total weight of the refractory mix.

19. The method claimed in claim 15, wherein said organic binder comprises about 3% to about 5% anhydrous resin, based on the total weight of the refractory mix.

20. The method claimed in claim 15, wherein said melting vessel is a steel making plant.

* * * * *